(12) United States Patent
Cai et al.

(10) Patent No.: US 10,699,420 B2
(45) Date of Patent: Jun. 30, 2020

(54) EYEBALL TRACKING METHOD AND APPARATUS, AND DEVICE

(71) Applicant: CHINA UNIONPAY CO., LTD., Shanghai (CN)

(72) Inventors: Zihao Cai, Shanghai (CN); Liang Feng, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 230 days.

(21) Appl. No.: 15/780,641

(22) PCT Filed: Nov. 30, 2016

(86) PCT No.: PCT/CN2016/108060
§ 371 (c)(1),
(2) Date: Jun. 1, 2018

(87) PCT Pub. No.: WO2017/092679
PCT Pub. Date: Jun. 8, 2017

(65) Prior Publication Data
US 2018/0365844 A1    Dec. 20, 2018

(30) Foreign Application Priority Data

Dec. 2, 2015 (CN) .......................... 2015 1 0875607

(51) Int. Cl.
*G06T 7/246* (2017.01)
*G06K 9/00* (2006.01)
(Continued)

(52) U.S. Cl.
CPC ............ *G06T 7/248* (2017.01); *G06K 9/0061* (2013.01); *G06K 9/00604* (2013.01); *G06K 9/80* (2013.01);
(Continued)

(58) Field of Classification Search
None
See application file for complete search history.

(56) References Cited

U.S. PATENT DOCUMENTS 7,480,396 B2 *   1/2009   Teiwes ................... A61B 3/113
                                                       351/206
7,593,550 B2 *   9/2009   Hamza ............... G06K 9/00597
                                                       382/117
(Continued)

FOREIGN PATENT DOCUMENTS

CN           1686051 A       10/2005
CN         101201893 A        6/2008
(Continued)

OTHER PUBLICATIONS

Farmanulla Jan, et al.: A non-circular iris localization algorithm using image projection function and gray level statistics, Optik 124, pp. 3187-3193, (2013).
(Continued)

*Primary Examiner* — Anand P Bhatnagar
(74) *Attorney, Agent, or Firm* — Renner, Otto, Boisselle & Sklar, LLP (57) ABSTRACT

An eyeball tracking method and apparatus, and a device. The method comprises: acquiring a facial grey-scale image set to be detected (101); judging whether the contour of an eyeball iris is determined in an N-th frame facial grey-scale image in the facial grey-scale image set to be detected (102); if not, detecting an eyeball pupil in the N-th frame facial grey-scale image, and determining the central position of the eyeball pupil in the N-th frame facial grey-scale image (103); in the N-th frame facial grey-scale image, taking the central position of the eyeball pupil as a centre to determine a grey-scale image region corresponding to an eyeball window (104); and according to the grey-scale image region corresponding to the eyeball window, determining the contour of the
(Continued)

eyeball iris in the N-th frame facial grey-scale image (105). By judging that the contour of an eyeball iris is not determined in a facial grey-scale image, the tracking of the contour of the eyeball iris can be automatically adjusted, and an eyeball pupil is positioned again. By means of the present invention, the accuracy rate of eyeball tracking is improved, and an eyeball can be automatically identified to detect the central position of an eyeball pupil.

22 Claims, 3 Drawing Sheets

(51) Int. Cl.
G06T 7/62 (2017.01)
G06T 7/73 (2017.01)
G06K 9/80 (2006.01)

(52) U.S. Cl.
CPC ................ *G06T 7/62* (2017.01); *G06T 7/74* (2017.01); *G06T 2207/20021* (2013.01); *G06T 2207/30201* (2013.01)

(56) References Cited

U.S. PATENT DOCUMENTS

| | | | |
|---|---|---|---|
| 7,682,026 B2 | 3/2010 | Huffman | |
| 7,970,179 B2* | 6/2011 | Tosa | G06K 9/00597 351/206 |
| 8,023,699 B2* | 9/2011 | Namgoong | G06K 9/0061 382/115 |
| 8,170,293 B2* | 5/2012 | Tosa | G06K 9/00604 382/115 |
| 8,317,325 B2* | 11/2012 | Raguin | A61B 3/1216 351/205 |
| 8,644,565 B2* | 2/2014 | Du | G06K 9/00604 382/103 |
| 10,445,574 B2* | 10/2019 | Odinokikh | G06K 9/00604 |
| 10,521,661 B2* | 12/2019 | Chen | G06K 9/00604 |
| 10,579,872 B2* | 3/2020 | Kim | G06K 9/6257 |
| 2006/0147094 A1* | 7/2006 | Yoo | G06K 9/00604 382/117 |
| 2008/0219515 A1* | 9/2008 | Namgoong | G06K 9/0061 382/117 |
| 2009/0220126 A1* | 9/2009 | Claret-Tournier | G06K 9/0061 382/117 |
| 2010/0002913 A1* | 1/2010 | Hamza | G06K 9/00597 382/117 |
| 2010/0027890 A1* | 2/2010 | Yoshinaga | G06F 3/013 382/195 |
| 2010/0284576 A1* | 11/2010 | Tosa | G06K 9/0061 382/117 |
| 2018/0365844 A1* | 12/2018 | Cai | G06T 7/248 |
| 2019/0073533 A1* | 3/2019 | Chen | G06K 9/00604 |

FOREIGN PATENT DOCUMENTS

| | | |
|---|---|---|
| CN | 103885589 A | 6/2014 |
| CN | 104050448 A | 9/2014 |
| CN | 105930762 A | 9/2016 |
| TW | 200905577 | 2/2009 |

OTHER PUBLICATIONS

Su Yeong Gwon, et al.: Robust Eye and Pupil Detection Method for Gaze Tracking, International Journal of Advanced Robotic Systems, vol. 10, 98: 2013.
Laura Florea, et al.: Robust eye centers localization with zero-crossing encoded image projections, Pattern Anal Applic, (2017) 20:127-143—published online May 9, 2015.
Lu Ling et al.: Digital Image Processing Method and Program Design, Harbin Engineering University Press, English Translation.
International Search Report for corresponding App. No. PCT/CN2016/108060, dated Mar. 1, 2017.
D. Tao et al., Fast eye and mouth location algorithm based on integral projection and color matching, Applied Research of Computers, vol. 26, No. 4, Apr. 2009, pp. 1578-1587.

* cited by examiner

EYEBALL TRACKING METHOD AND APPARATUS, AND DEVICE

This application is a U.S. National Stage of International Application No. PCT/CN2016/108060, filed on Nov. 30, 2016, designating the United States and claiming the priority of Chinese Patent Application No. 201510875607.9, filed with the Chinese Patent Office on Dec. 2, 2015, and entitled "a method and apparatus for eye-tracking". The entire disclosure of each of the above applications is incorporated herein by reference.

FIELD

The present disclosure relates to the field of visual tracking, and particularly to a method and apparatus for eye-tracking.

BACKGROUND

Eye tracking is an algorithm for tracking motion of an eye, where for each frame of a video, a contour of an iris can be detected and located, then fit and marked by using an optimum box, and a central position of a pupil can be calculated.

SUMMARY

An embodiment of the disclosure provides a method, apparatus, and device for eye-tracking so as to detect a starting point of an eyeball automatically, and adjust the tracking automatically when an error occurs to recognition of the contour of the eyeball.

In a first aspect, the embodiment of the disclosure provides a method for eye-tracking. The method includes: obtaining a set of face grayscale images to be detected, where the set of face grayscale images includes a plurality of frames of face grayscale images; judging whether a contour of an iris is determined in an N-th frame of the plurality of frames, where N is a positive integer; when the contour of the iris is not determined in the N-th frame, detecting a pupil in the N-th frame, and determining a central position of the pupil in the N-th frame; determining an area of the N-th frame of the face grayscale images corresponding to an eyeball window, where the central position of the pupil is a center of the area; and determining the contour of the iris in the N-th frame according to the area corresponding to the eyeball window.

In an implementation, when the contour of the iris is determined in the N-th frame, then the method further includes: making the central position of the pupil determined according to the contour of the iris in the N-th frame as a central position of the pupil in an (N+1)-th frame; determining an area of the (N+1)-th frame of the face grayscale images corresponding to an eyeball window, where the central position of the pupil in the (N+1)-th frame is a center of the area of the (N+1)-th frame corresponding to the eyeball window; and determining a contour of the iris in the (N+1)-th frame according to a preset condition and the area of the (N+1)-th frame corresponding to the eyeball window.

In an implementation, detecting the pupil in the N-th frame, and determining the central position of the pupil in the N-th frame includes: performing horizontal integral projection for the N-th frame, and obtaining a horizontal projection curve of the N-th frame; determining coordinates of left and right eyeballs in a vertical direction of the N-th frame according to the horizontal projection curve of the N-th frame; performing vertical integral projection for an area of the N-th frame corresponding to coordinates of the left and right eyeballs in the vertical direction of the N-th frame, and obtaining a vertical projection curve of the N-th frame; determining coordinates of the left and right eyeballs in a horizontal direction of the N-th frame according to the vertical projection curve of the N-th frame; and determining the central position of the pupil according to the coordinates of the left and right eyeballs in the vertical and horizontal directions of the N-th frame.

In an implementation, performing the horizontal integral projection for the N-th frame and obtaining the horizontal projection curve of the N-th frame includes: removing pixels having grayscale values above a first threshold in the N-th frame, then performing horizontal integral projection for the N-th frame, and obtaining the horizontal projection curve of the N-th frame.

In an implementation, determining the coordinates of the left and right eyeballs in the vertical direction of the N-th frame according to the horizontal projection curve of the N-th frame includes: preprocessing the horizontal projection curve of the N-th frame, and determining coordinates in the N-th frame corresponding to an area between a second trough and a third trough of the preprocessed horizontal projection curve of the N-th frame as the coordinates of the left and right eyeballs in the vertical direction of the N-th frame. The horizontal projection curve of the N-th frame is preprocessed by selecting values of peaks in the horizontal projection curve, and a distance of each of the peaks along the vertical direction of the N-th frame from a nearest trough or crest of the horizontal projection curve is greater than a second threshold.

In an implementation, determining the coordinates of the left and right eyeballs in the horizontal direction of the N-th frame according to the vertical projection curve of the N-th frame includes: preprocessing the vertical projection curve of the N-th frame, and determining coordinates, in the N-th frame, corresponding to two symmetric troughs, with a central axis of the preprocessed vertical projection curve of the N-th frame being a symmetry axis, in the vertical projection curve of the N-th frame, as the coordinates of the left and right eyeballs in the horizontal direction of the N-th frame. The vertical projection curve of the N-th frame is preprocessed by selecting peak values with their distances between a trough and a peak being above the second threshold in the vertical projection curve of the N-th frame.

In an implementation, determining the central position of the pupil according to the coordinates of the left and right eyeballs in the vertical direction and horizontal directions of the N-th frame includes: selecting pixels having grayscale values below a third threshold in an area defined by the coordinates of the left and right eyeballs in the vertical and horizontal directions of the N-th frame to constitute two sets of positions of pupils of the left and right eyeballs, where the two sets of positions consist of coordinates of the pixels having grayscale values below the third threshold in the area; and determining a centroid of one of the two sets of positions as the central position of the pupil.

In an implementation, determining the area of the face grayscale image corresponding to the eyeball window includes: making leftward and rightward extensions over a first preset distance in the horizontal direction of the N-th or (N+1)-th frame, and making upward and downward extensions over a second preset distance in the vertical direction of the N-th or (N+1)-th frame, where each of the extensions has the central position of the pupil as a center; and determining areas extended over the N-th or (N-+1)-th frame with the central position of the pupil being the center of the extensions as the area corresponding to the eyeball window.

In an implementation, determining the contour of the iris in the N-th or (N+1)-th frame according to the area corresponding to the eyeball window includes: starting to search from the central position of the pupil and within the area corresponding to the eyeball window according to a preset condition; determining a grayscale value of a position to which a search is made as a reference grayscale value of the search; if a difference between a reference grayscale value of an M-th search and a reference grayscale value of an (M+1)-th search is above a fourth threshold, then determining a point to which the M-th search is made as a point at an edge of the iris, where M is a positive integer; and determining the contour of the iris in the N-th or (N+1)-th frame according to points at edges of the iris.

In an implementation, the preset condition is that, each search is made over a distance d at a searching angle of a1+(x−1)λ. a1 is a first angle threshold, x is the number of searches, and π is a second angle threshold. The method further includes: when the searching angle is more than or equal to a2, stopping searching within the area corresponding to the eyeball window a2 is a third angle threshold, a2 is more than a1, and a2 is more than λ.

In a second aspect, the embodiment of the disclosure further provides an apparatus for eye-tracking. The apparatus includes a processor and a memory storing at least one instruction. The processor is configured to execute the at least one instruction to: obtain a set of face grayscale images to be detected, where the set of face grayscale images includes a plurality of frames of face grayscale images; judge whether a contour of an iris is determined in an N-th frame of the plurality of frames, where N is a positive integer; detect a pupil in the N-th frame and determine a central position of the pupil in the N-th frame when the contour of the iris is not determined in the N-th frame; determine an area of the N-th frame corresponding to an eyeball window, where the central position of the pupil is a center of the area; and determine the contour of the iris in the N-th frame according to the area corresponding to the eyeball window.

In an implementation, when the contour of the iris is determined in the N-th frame, then the processor is further configured to execute the at least one instruction to: make the central position of the pupil determined according to the contour of the iris in the N-th frame as a central position of the pupil in an (N+1)-th frame; determine an area of the (N+1)-th frame corresponding to an eyeball window, where the central position of the pupil in the (N+1)-th frame is a center of the area of the (N+1)-th frame corresponding to the eyeball window; and determine a contour of the iris in the (N+1)-th frame according to a preset condition and the area of the (N+1)-th frame corresponding to the eyeball window.

In an implementation, the processor is further configured to execute the at least one instruction to: perform horizontal integral projection for the N-th frame, and obtain a horizontal projection curve of the N-th frame; determine coordinates of left and right eyeballs in a vertical direction of the N-th frame according to the horizontal projection curve of the N-th frame; perform vertical integral projection for an area of the N-th frame corresponding to coordinates of the left and right eyeballs in the vertical direction of the N-th frame, and obtain a vertical projection curve of the N-th frame; determine coordinates of the left and right eyeballs in a horizontal direction of the N-th frame according to the vertical projection curve of the N-th frame; and determine the central position of the pupil according to the coordinates of the left and right eyeballs in the vertical and horizontal directions of the N-th frame.

In an implementation, the processor is further configured to execute the at least one instruction to: remove pixels having grayscale values above a first threshold in the N-th frame, then perform horizontal integral projection for the N-th frame, and obtain the horizontal projection curve of the N-th frame.

In an implementation, the processor is further configured to execute the at least one instruction to: preprocess the horizontal projection curve of the N-th frame, and determine coordinates in the N-th frame corresponding to an area between a second trough and a third trough of the preprocessed horizontal projection curve of the N-th frame as the coordinates of the left and right eyeballs in the vertical direction of the N-th frame. The horizontal projection curve of the N-th frame is preprocessed by selecting values of peaks in the horizontal projection curve, and a distance of each of the peaks along the vertical direction of the N-th frame from a nearest trough or crest of the horizontal projection curve is greater than a second threshold.

In an implementation, the processor is further configured to execute the at least one instruction to: preprocess the vertical projection curve of the N-th frame, and determine coordinates, in the N-th frame, corresponding to two symmetric troughs, with a central axis of the preprocessed vertical projection curve of the N-th frame being a symmetry axis, in the vertical projection curve of the N-th frame, as the coordinates of the left and right eyeballs in the horizontal direction of the N-th frame. The vertical projection curve of the N-th frame is preprocessed by selecting peak values with their distances between a trough and a peak being above the second threshold in the vertical projection curve of the N-th frame.

In an implementation, the processor is further configured to execute the at least one instruction to: select pixels having grayscale values below a third threshold in an area defined by the coordinates of the left and right eyeballs in the vertical and horizontal directions of the N-th frame to constitute two sets of positions of pupils of the left and right eyeballs, where the two sets of positions consist of coordinates of the pixels having grayscale values below the third threshold in the area; and determine a centroid of one of the two sets of positions as the central position of the pupil.

In an implementation, the processor is further configured to execute the at least one instruction to: make leftward and rightward extensions over a first preset distance in the horizontal direction of the N-th or (N+1)-th frame, and make upward and downward extensions over a second preset distance in the vertical direction of the N-th or (N+1)-th frame, where each of the extensions has the central position of the pupil as a center; and determine areas extended over the N-th or (N+1)-th frame with the central position of the pupil being the center of the extensions as the area corresponding to the eyeball window.

In an implementation, the processor is further configured to execute the at least one instruction to: start to search from the central position of the pupil and within the area corresponding to the eyeball window according to a preset condition; determine a grayscale value of a position to which a search is made as a reference grayscale value of the search; if a difference between a reference grayscale value of an M-th search and a reference grayscale value of an (M+1)-th search is above a fourth threshold, then determine a point to which the M-th search is made as a point at an edge of the iris, where M is a positive integer; and determine the contour of the iris in the N-th or (N+1)-th frame according to points at edges of the iris.

In an implementation, the preset condition is that, each search is made over a distance d at a searching angle of a1+(x−1)λ. a1 is a first angle threshold, x is the number of searches, and λ is a second angle threshold. The processor is further configured to execute the at least one instruction to stop searching within the area corresponding to the eyeball window when the searching angle is more than or equal to a2. a2 is a third angle threshold, a2 is more than a1, and a2 is more than λ.

In a third aspect, the embodiment of the disclosure further provides a non-transitory computer readable storage medium. The non-transitory computer readable storage medium stores computer instructions configured to enable the computer to perform the method for eye-tracking according to the first aspect.

In a fourth aspect, the embodiment of the disclosure further provides a computer program product. The computer program product includes a computer program stored in a non-transitory computer readable storage medium. The computer program includes program instructions. When the program instructions are executed by a computer, the computer is configured to perform the method for eye-tracking according to the first aspect.

BRIEF DESCRIPTION OF THE DRAWINGS

One or more implementations are illustrated below with reference to corresponding drawings. Such illustrations are not intended to limit the implementations thereto. Elements with a same reference numeral in the drawings represent like elements. The drawings are not intended to limit any proportion unless stated otherwise.

DETAILED DESCRIPTION OF AN EMBODIMENT

In order to make the objects, technical solutions, and advantages of the disclosure clearer, the disclosure is described below in further details in connection with a particular embodiment thereof, and with reference to the drawings. It shall be appreciated that these descriptions are only intended to be illustrative, but not to limit the scope of the disclosure thereto. Furthermore a description of well-known structures and technologies is omitted in the following description so as not to obscure the concept of the disclosure unnecessarily.

Figure 1:
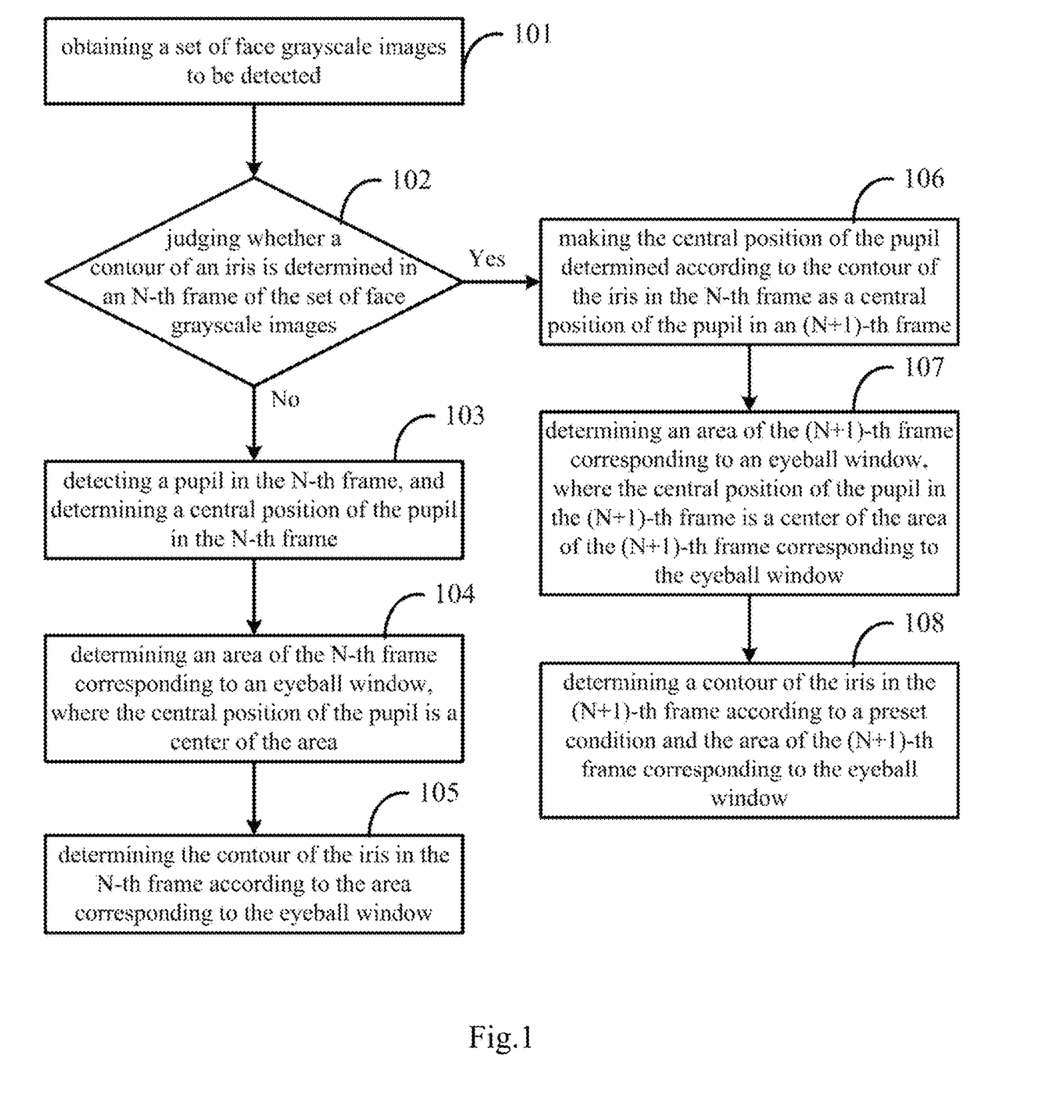
FIG. 1 is a schematic flow chart of a method for eye-tracking according to an embodiment of the disclosure.

FIG. 1 illustrates a flow of a method for eye-tracking according to an embodiment of the disclosure, and the flow can be performed by an apparatus for eye-tracking.

As illustrated, the flow includes operations 101-107.

The operation 101: obtaining a set of face grayscale images to be detected.

The operation 102: judging whether a contour of an iris is determined in an N-th frame of the set of face grayscale images.

The operation 103: detecting a pupil in the N-th frame, and determining a central position of the pupil in the N-th frame.

The operation 104: determining an area of the N-th frame corresponding to an eyeball window, where the central position of the pupil is a center of the area.

The operation 105: determining the contour of the iris in the N-th frame according to the area corresponding to the eyeball window.

The operation 106: making the central position of the pupil determined according to the contour of the iris in the N-th frame as a central position of the pupil in an (N+1)-th frame.

The operation 107: determining an area of the (N+1)-th frame corresponding to an eyeball window, where the central position of the pupil in the (N+1)-th frame is a center of the area of the (N+1)-th frame corresponding to the eyeball window.

The operation 108: determining a contour of the iris in the (N+1)-th frame according to a preset condition and the area of the (N+1)-th frame corresponding to the eyeball window.

In the operation 101, the set of face grayscale images to be detected includes a plurality of frames. A video is segmented into the plurality of frames, and these frames constitute the set. If the frames are colored, then they are converted into grayscale images, thus resulting in the face grayscale images to be detected.

In the operation 102, it is judged whether the contour of the iris can be determined in the N-th frame obtained in the operation 101. If the contour of the iris can be determined in the N-th frame, which indicates that the eye tracking in the N-th frame does not go wrong, then the eye tracking in the (N+1)-th frame can be performed. Otherwise, if the contour of the iris cannot be determined in the N-th frame, which might be caused by an error of the eye tracking in the N-th frame, then the central position of the pupil in the N-th frame needs to be determined again. Or the contour of the iris cannot be determined in the N-th frame because the N-th frame is a first frame, and the central position of the pupil in the first frame needs to be determined, where N is a positive integer.

In the operation 103, if it is judged in the operation 102 that the contour of the iris is not determined in the N-th frame, then the pupil is detected in the N-th frame, and the central position of the pupil in the N-th frame is determined.

In an implementation, horizontal integral projection is performed for the N-th frame, and a horizontal projection curve of the N-th frame is obtained. Pixels having grayscale values greater than a first threshold in the N-th frame are removed, after which the horizontal integral projection is performed on the N-th frame. The first threshold can be set empirically, e.g., set to a grayscale value of 100. Removing pixels having grayscale values greater than the first threshold in the N-th frame means performing noise reduction for the N-th frame. A smooth curve can be obtained.

Figure 2:
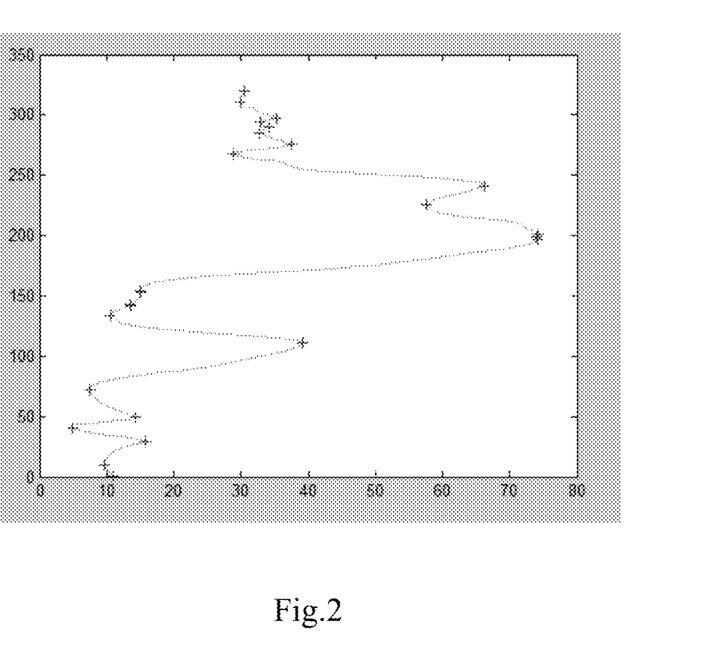
FIG. 2 is a schematic diagram of a horizontal projection curve before preprocessing according to the embodiment of the disclosure.
Figure 3:
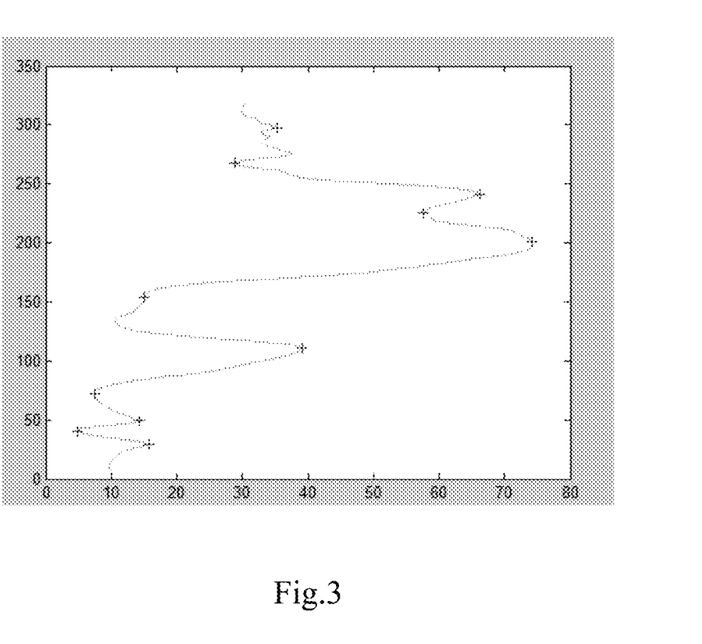
FIG. 3 is a schematic diagram of a horizontal projection curve after preprocessing according to the embodiment of the disclosure.

After obtaining the horizontal projection curve, coordinates of left and right eyeballs in a vertical direction of the N-th frame can be determined according to the horizontal projection curve of the N-th frame. The horizontal projection curve of the N-th frame is preprocessed, and coordinates in the N-th frame corresponding to an area between a second trough and a third trough of the preprocessed horizontal projection curve of the N-th frame are determined as the coordinates of the left and right eyeballs in the vertical direction of the N-th frame. The horizontal projection curve of the N-th frame is preprocessed by selecting values of peaks in the horizontal projection curve of the N-th frame, where a distance of each of the peaks along the ordinate from a nearest trough or from a nearest crest is greater than a second threshold. The second threshold can be set empirically, and only the above-mentioned peak values can be reserved. As illustrated by FIGS. 2 and 3, where FIG. 2 illustrates the horizontal projection curve before the preprocessing, FIG. 3 illustrates the horizontal projection curve after the preprocessing, and "+" as illustrated represents a position of a peak value, a part of "+" in FIG. 2 are removed after preprocessing.

For example, FIG. 3 illustrates a horizontal projection curve, where the ordinate represents grayscale values, and the abscissa represents coordinates in the vertical direction of the face grayscale image. A peak value of a trough is on the left, and a peak value of a crest is on the right. As illustrated in FIG. 3, the first trough represents the position of hair, the second trough represents the position of an eyebrow, and the area between the second trough and the third trough represents the left and right eyeballs, so that the coordinates of the left and right eyeballs in the vertical direction of the N-th frame can be determined.

Vertical integral projection is performed on an area of the N-th frame corresponding to the coordinates of the e left and right eyeballs in the vertical direction of the N-th frame, and a vertical projection curve of the N-th frame is obtained. An abscissa of the vertical projection curve represents coordinates in a horizontal direction of the face grayscale image, and an ordinate thereof represents grayscale values.

Coordinates of the left and right eyeballs in the horizontal direction of the N-th frame are determined according to the vertical projection curve of the N-th frame. The vertical projection curve of the N-th frame is preprocessed, and coordinates, in the N-th frame, corresponding to two symmetric troughs in the vertical projection curve of the N-th frame, re determined as the coordinates of the left and right eyeballs in the horizontal direction of the N-th frame. The symmetry axis of the two symmetric troughs is a central axis of the preprocessed vertical projection curve. Coordinates of two troughs on two sides of and symmetric to the central axis are horizontal coordinates of left and right eyes, so that the coordinates of the left and right eyeballs in the horizontal direction of the N-th frame can be determined. The vertical projection curve of the N-th frame is preprocessed by selecting values of peaks, where a distance of each of the peaks along the abscissa from a nearest trough or from a nearest crest is greater than the second threshold in the vertical projection curve of the N-th frame.

In the above-mentioned horizontal integral projection and vertical integral projection, since the left and right eyeballs are black and thus have low grayscale values, rough positions of the eyes can be detected by searching the projection curves for troughs. However, in a real observation, the curves generally fluctuate significantly due to interference of the background and the human face, so many unwanted minor troughs actually exist in a major trough and may hinder obtaining the real positions of the eyes. In view of this challenge, the above-mentioned horizontal integral projection curve and the vertical integral projection curve need to be preprocessed.

Central positions of pupils of the left and right eyes are determined according to the coordinates of the left and right eyeballs in the vertical and horizontal directions of the N-th frame. Pixels having grayscale values below a third threshold are selected in an area defined by the coordinates of the left and right eyeballs in the vertical and horizontal directions of the N-th frame, and coordinates of such pixels constitute two sets of positions of the pupils. A centroid of one of the two sets of positions is determined as a central position of a pupil. The third threshold can be set empirically. A pixel having a grayscale value below the third threshold represents a position of a black iris. Longest portions consisting of continuous pixels having grayscale values below the third threshold in each row of pixels in the above-mentioned area can be selected to constitute two sets of pixels, and a centroid of one of the two sets of pixels is a central position of a pupil.

In the operation 104, after the central position of the pupil is determined in the operation 103, leftward and rightward extensions over a first preset distance in the horizontal direction of the N-th frame can be made, and upward and downward extensions over a second preset distance in the vertical direction of the N-th frame can be made. Each of such extensions has the central position of the pupil as a center, Areas extended over the N-th frame with the central position of the pupil being the center of the extensions are determined as the area corresponding to the eyeball window. The first preset distance and the second preset distance can be set empirically.

The grayscale image area determined after the leftward and rightward extensions over the first preset distance in the horizontal direction of the N-th frame, and the upward and downward extensions over the second preset distance in the vertical direction of the N-th frame, with the central position of the pupil being the center of the extensions, can be determined as a grayscale image corresponding to the eyeball window.

In the operation 105, after the grayscale image corresponding to the eyeball window is determined in the operation 104, starting to search from the central position of the pupil and within the grayscale image area corresponding to the eyeball window according to the preset condition, and determining a grayscale value of a point to which a search is made as a reference grayscale value of the search. If a difference between a reference grayscale value of an M-th search and a reference grayscale value of an (M+1)-th search is above a fourth threshold, then a point to which the M-th search is made is determined as a point at an edge of the iris. M is a positive integer, and the fourth threshold can be set empirically. Since the iris and the white have different grayscale values, a significant difference between grayscale values of points to which two adjacent searches are made respectively indicates a position at the edge of the iris. The contour of the iris in the N-th frame is determined according to points at the edges of the iris.

The preset condition is that, each search is made over a distance of d at a searching angle of $a1+(x-1)\lambda$. $a1$ is a first angle threshold, x is the number of searches, and $\lambda$ is a second angle threshold. When the searching angle is more than or equal to $a2$, searching in the grayscale image area corresponding to the eyeball window is stopped, where $a2$ is a third angle threshold, $a2$ is more than $a1$, and $a2$ is more than $\lambda$. The first angle threshold, the second angle threshold, the third angle threshold, and the distance of each search can be set empirically.

In the operation 106, if it is judged in the operation 102 that the contour of the iris is determined in the N-th frame of the set of face grayscale images, eye-tracking can be made in the (N+1)-th frame. Then the central position of the pupil determined according to the contour of the iris in the N-th frame is determined as the central position of the pupil in the (N+1)-th frame.

In the operation 107, after the central position of the pupil in the (N+1)-th frame is determined in the operation 106, leftward and rightward extensions over a first preset distance in the horizontal direction of the (N+1)-th frame can be made, and upward and downward extensions over a second preset distance in the vertical direction of the (N+1)-th frame can be made. Each of such extensions has the central position of the pupil as a center. Areas extended over the (N+1)-th frame with the central position of the pupil being the center of the extensions are determined as the area corresponding to the eyeball window. The first preset distance and the second preset distance can be set empirically.

The grayscale image area determined after the leftward and rightward extensions over the first preset distance in the horizontal direction of the (N+1)-th frame, and the upward and downward extensions over the second preset distance in the vertical direction of the N-th frame, with the central position of the pupil being the center of the extensions, can be determined as a grayscale image corresponding to the eyeball window.

In the operation 108, after the grayscale image corresponding to the eyeball window is determined in the operation 107, starting to search from the central position of the pupil and within the grayscale image area corresponding to the eyeball window according to the preset condition, and determining a grayscale value of a point to which a search is made as a reference grayscale value of the search. If a difference between a reference grayscale value of an M-th search and a reference grayscale value of an (M+1)-th search is above a fourth threshold, then a point to which the M-th search is made is determined as a point at an edge of the iris. M is a positive integer, and the fourth threshold can be set empirically. Since the iris and the white have different grayscale values, a significant difference between grayscale values of points to which two adjacent searches are made respectively indicates a position at the edge of the iris. The contour of the iris in the (N+1)-th frame is determined according to points at the edges of the iris.

The preset condition is that, each search is made over a distance of d at a searching angle of $a1+(x-1)\lambda$. $a1$ is a first angle threshold, x is the number of searches, and $\lambda$ is a second angle threshold. When the searching angle is more than or equal to a2, searching in the grayscale image area corresponding to the eyeball window is stopped, where a2 is a third angle threshold, a2 is more than a1, and a2 is more than $\lambda$. The first angle threshold, the second angle threshold, the third angle threshold, and the distance of each search can be set empirically.

In the abovementioned embodiment, a set of face grayscale images to be detected is obtained; it is judged whether a contour of an iris is detected in the N-th frame of the set of face grayscale images, and if not, a pupil is detected in the N-th frame, a central position of the pupil in the N-th frame is determined, an area of the N-th frame corresponding to an eyeball window is determined, where the central position of the pupil is a center of the area, and the contour of the iris in the N-th frame is determined according to the area corresponding to the eyeball window. By judging that the contour of the iris is not detected in the face grayscale image, tracking of the contour of the iris can be adjusted automatically, and the pupil can be re-located, thus avoiding the tracking from failing to be adjusted automatically after an error has occurred in the tracking, improving the accuracy of eye tracking, automatically identifying the eyeball and detecting the central position of the pupil.

Figure 4:
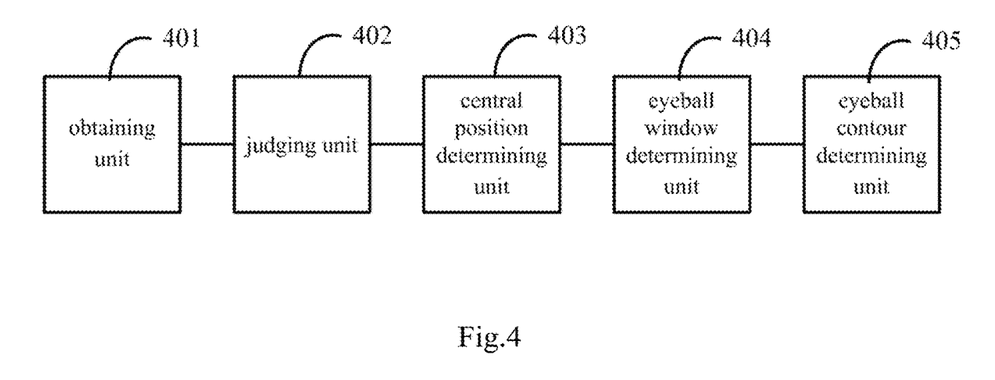
FIG. 4 is a schematic structural diagram of an apparatus for eye-tracking according to the embodiment of the disclosure.

Based upon the same technical conception, FIG. 4 illustrates a structure of an apparatus for eye-tracking according to the embodiment of the disclosure. The apparatus can perform a flow of eye-tracking.

As illustrated by FIG. 4, the apparatus includes an obtaining unit 401, a judging unit 402, a central position determining unit 403, an eyeball window determining unit 404 and an eyeball contour determining unit 405.

The obtaining unit 401 is configured to obtain a set of face grayscale images to be detected. The set of face grayscale images includes a plurality of frames of face grayscale images.

The judging unit 402 is configured to judge whether a contour of an iris is determined in an N-th frame of the set of face grayscale images. N is a positive integer.

The central position determining unit 403 is configured to detect a pupil in the N-th frame and determine a central position of the pupil in the N-th frame when the contour of the iris is not determined in the N-th frame.

The eyeball window determining unit 404 is configured to determine an area of the N-th frame corresponding to an eyeball window, wherein the central position of the pupil is a center of the area.

The eyeball contour determining unit 405 is configured to determine the contour of the iris in the N-th frame according to the area corresponding to the eyeball window.

In an implementation, when the contour of the iris is determined in the N-th frame, then the central position determining unit 403 is further configured to make the central position of the pupil determined according to the contour of the iris in the N-th frame as a central position of the pupil in an (N+1)-th frame.

The eyeball window determining unit 404 is further configured to determine an area of the (N+1)-th frame corresponding to an eyeball window. The central position of the pupil in the (N+1)-th frame is a center of the area of the (N+1)-th frame corresponding to the eyeball window.

The eyeball contour determining unit 405 is further configured to determine a contour of the iris in the (N+1)-th frame according to a preset condition and the area of the (N+1)-th frame corresponding to the eyeball window.

In an implementation, the central position determining unit 403 is further configured to: perform horizontal integral projection for the N-th frame, and obtain a horizontal projection curve of the N-th frame; determine coordinates of left and right eyeballs in a vertical direction of the N-th frame according to the horizontal projection curve of the N-th frame; perform vertical integral projection for an area of the N-th frame corresponding to coordinates of the left and right eyeballs in the vertical direction of the N-th frame, and obtain a vertical projection curve of the N-th frame; determine coordinates of the left and right eyeballs in a horizontal direction of the N-th frame according to the vertical projection curve of the N-th frame; and determine the central position of the pupil according to the coordinates of the left and right eyeballs in the vertical and horizontal directions of the N-th frame.

In an implementation, the central position determining unit 403 is further configured to: remove pixels having grayscale values above a first threshold in the N-th frame, then perform horizontal integral projection for the N-th frame, and obtain the horizontal projection curve of the N-th frame.

In an implementation, the central position determining unit 403 is configured further configured to: preprocess the horizontal projection curve of the N-th frame, and determine coordinates in the N-th frame corresponding to an area between a second trough and a third trough of the preprocessed horizontal projection curve of the N-th frame as the coordinates of the left and right eyeballs in the vertical direction of the N-th frame. The horizontal projection curve of the N-th frame is preprocessed by selecting values of peaks in the horizontal projection curve, and a distance of each of the peaks along the vertical direction of the N-th frame from a nearest trough or crest of the horizontal projection curve is greater than a second threshold.

In an implementation, the central position determining unit 403 is further configured to: preprocess the vertical projection curve of the N-th frame, and determine coordinates, in the N-th frame, corresponding to two symmetric troughs, with a central axis of the preprocessed vertical projection curve of the N-th frame being a symmetry axis, in the vertical projection curve of the N-th frame, as the coordinates of the left and right eyeballs in the horizontal direction of the N-th frame. The vertical projection curve of the N-th frame is preprocessed by selecting peak values with their distances between a trough and a peak being above the second threshold in the vertical projection curve of the N-th frame.

In an implementation, the central position determining unit 403 is further configured to: select pixels having grayscale values below a third threshold in an area defined by the coordinates of the left and right eyeballs in the vertical and horizontal directions of the N-th frame to constitute two sets of positions of pupils of the left and right eyeballs, where the two sets of positions consist of coordinates of the pixels having grayscale values below the third threshold in the area; and determine a centroid of one of the two sets of positions as the central position of the pupil.

In an implementation, the eyeball window determining unit 404 is further configured to: make leftward and rightward extensions over a first preset distance in the horizontal direction of the N-th or (N+1)-th frame, and make upward and downward extensions over a second preset distance in the vertical direction of the N-th or (N+1)-th frame, where each of the extensions has the central position of the pupil as a center; and determine areas extended over the N-th or (N+1)-th frame with the central position of the pupil being the center of the extensions as the area corresponding to the eyeball window.

In an implementation, the eyeball contour determining unit 405 is further configured to: start to search from the central position of the pupil and within the area corresponding to the eyeball window according to a preset condition; determine a grayscale value of a position to which a search is made as a reference grayscale value of the search; if a difference between a reference grayscale value of an M-th search and a reference grayscale value of an (M+1)-th search is above a fourth threshold, then determine a point to which the M-th search is made as a point at an edge of the iris, where M is a positive integer; and determine the contour of the iris in the N-th or (N+1)-th frame according to points at edges of the iris.

In an implementation, the preset condition is that, each search is made over a distance d at a searching angle of $a1+(x-1)\lambda$. $a1$ is a first angle threshold, x is the number of searches, and $\lambda$ is a second angle threshold. The eyeball contour determining unit 405 is further configured to stop searching within the area corresponding to the eyeball window when the searching angle is more than or equal to $a2$. $a2$ is a third angle threshold, $a2$ is more than $a1$, and $a2$ is more than $\lambda$.

Based upon the same technical conception, the embodiment of the disclosure provides a device for eye-tracking. The device includes at least one processor and a memory communicatively connected with the at least one processor. The memory stores instructions executable by the at least one processor, and the instructions are executed by the at least one processor to enable the at least one processor to perform the above-mentioned method for eye-tracking according to the embodiment of the disclosure.

Figure 5:
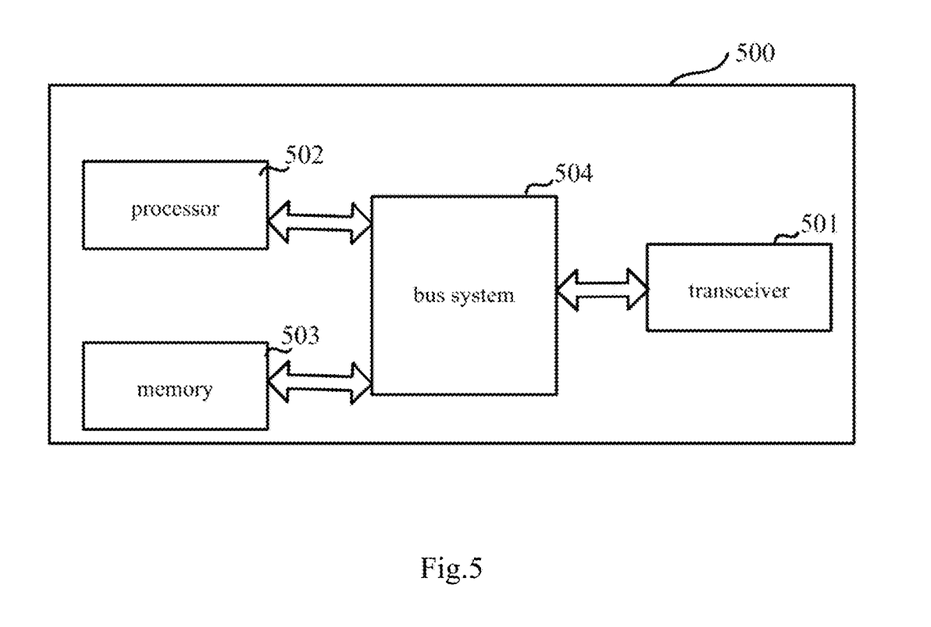
FIG. 5 is a schematic structural diagram of a device for eye-tracking according to the embodiment of the disclosure.

Taking one processor as an example, FIG. 5 illustrates a structure of the device for eye-tracking according to the embodiment of the disclosure. The device 500 for eye-tracking includes a transceiver 501, a processor 502, a memory 503, and a bus system 504.

The memory 503 is configured to store a program. In an implementation, the program can include program codes including computer operating instructions. The memory 503 can be a random access memory (RAM) or a non-transitory memory, e.g., at least one disk memory. FIG. 5 illustrates only one memory, but the device 500 may also have a plurality of memories as needed. The memory 503 may also be a memory in the processor 502.

The memory 503 stores the following elements, executable modules or data structures, or a subset thereof, or an extended set thereof: operating instructions including various operating instructions for performing various operations; and an operating system including various system programs for performing various general services and handling hardware based tasks.

The abovementioned method for eye-tracking according to the embodiment of the disclosure can be applied to the processor 502, or performed by the processor 502. The processor 502 can be an integrated circuit chip able to process signals. In an implementation, each operation of the method for eye-tracking can be performed through a hardware integrated logic circuit or a software instruction of the processor 502. The processor 502 can be a general-purpose processor, a digital signal processor (DSP), an application specific integrated circuit (ASIC), a field programmable gate array (FPGA) or another programmable logic device, a discrete gate, a transistor logic device, or a discrete hardware component. The processor 502 can perform or implement the respective methods, operations, and logic block diagrams according to the embodiment of the disclosure. The general-purpose processor can be a microprocessor, or can be any conventional processor. The operations of the method according to the embodiment of the disclosure can be performed directly by a hardware decoding processor, or performed by a combination of hardware and software modules of a decoding processor. The software module can be in a storage medium known in the art such as a random memory, a flash memory, a read-only memory, a programmable read-only memory, an electrically erasable and programmable memory or a register. The storage medium is located in the memory 503. The processor 502 reads information stored in the memory 503, and performs the following operations in combination with the hardware thereof.

The transceiver 501 is configured to obtain a set of face grayscale images to be detected. The set of face grayscale images includes a plurality of frames of face grayscale images.

The processor 502 is configured to judge whether a contour of an iris is determined in an N-th frame of the set of face grayscale images. N is a positive integer. If the contour of the iris is not determined in the N-th frame, the processor 502 is further configured to detect a pupil in the N-th frame, and determine a central position of the pupil in the N-th frame. The processor 502 is further configured to determine an area of the N-th frame corresponding to an eyeball window, where the central position of the pupil is a center of the area; and determine the contour of the iris in the N-th frame according to the area corresponding to the eyeball window.

In an implementation, when the contour of the iris is determined in the N-th frame, then the processor 502 is further configured to: make the central position of the pupil determined according to the contour of the iris in the N-th frame as a central position of the pupil in an (N+1)-th frame; determine an area of the (N+1)-th frame corresponding to an eyeball window, where the central position of the pupil in the (N+1)-th frame is a center of the area of the (N+1)-th frame corresponding to the eyeball window; and determine a contour of the iris in the (N+1)-th frame according to a preset condition and the area of the (N+1)-th frame corresponding to the eyeball window.

In an implementation, the processor 502 is further configured to: perform horizontal integral projection for the N-th frame, and obtain a horizontal projection curve of the N-th frame;

determine coordinates of left and right eyeballs in a vertical direction of the N-th frame according to the horizontal projection curve of the N-th frame; perform vertical integral projection for an area of the N-th frame corresponding to coordinates of the left and right eyeballs in the vertical direction of the N-th frame, and obtain a vertical projection curve of the N-th frame; determine coordinates of the left and right eyeballs in a horizontal direction of the N-th frame according to the vertical projection curve of the N-th frame; and determine the central position of the pupil according to the coordinates of the left and right eyeballs in the vertical and horizontal directions of the N-th frame.

In an implementation, the processor 502 is further configured to: remove pixels having grayscale values above a first threshold in the N-th frame, then perform horizontal integral projection for the N-th frame, and obtain the horizontal projection curve of the N-th frame.

In an implementation, the processor 502 is further configured to: preprocess the horizontal projection curve of the N-th frame, and determine coordinates in the N-th frame corresponding to an area between a second trough and a third trough of the preprocessed horizontal projection curve of the N-th frame as the coordinates of the left and right eyeballs in the vertical direction of the N-th frame. The horizontal projection curve of the N-th frame is preprocessed by selecting values of peaks in the horizontal projection curve, and a distance of each of the peaks along the vertical direction of the N-th frame from a nearest trough or crest of the horizontal projection curve is greater than a second threshold.

In an implementation, the processor 502 is further configured to: preprocess the vertical projection curve of the N-th frame, and determine coordinates, in the N-th frame, corresponding to two symmetric troughs, with a central axis of the preprocessed vertical projection curve of the N-th frame being a symmetry axis, in the vertical projection curve of the N-th frame, as the coordinates of the left and right eyeballs in the horizontal direction of the N-th frame. The vertical projection curve of the N-th frame is preprocessed by selecting peak values with their distances between a trough and a peak being above the second threshold in the vertical projection curve of the N-th frame.

In an implementation, the processor 502 is further configured to: select pixels having grayscale values below a third threshold in an area defined by the coordinates of the left and right eyeballs in the vertical and horizontal directions of the N-th frame to constitute two sets of positions of pupils of the left and right eyeballs, where the two sets of positions consist of coordinates of the pixels having grayscale values below the third threshold in the area; and determine a centroid of one of the two sets of positions as the central position of the pupil.

In an implementation, the processor 502 is further configured to: make leftward and rightward extensions over a first preset distance in the horizontal direction of the N-th or (N+1)-th frame, and make upward and downward extensions over a second preset distance in the vertical direction of the N-th or (N+1)-th frame, where each of the extensions has the central position of the pupil as a center; and determine areas extended over the N-th or (N+1)-th frame with the central position of the pupil being the center of the extensions as the area corresponding to the eyeball window.

In an implementation, the processor 502 is further configured to: start to search from the central position of the pupil and within the area corresponding to the eyeball window according to a preset condition; determine a grayscale value of a position to which a search is made as a reference grayscale value of the search; if a difference between a reference grayscale value of an M-th search and a reference grayscale value of an (M+1)-th search is above a fourth threshold, then determine a point to which the M-th search is made as a point at an edge of the iris, where M is a positive integer; and determine the contour of the iris in the N-th or (N+1)-th frame according to points at edges of the iris.

In an implementation, the preset condition is that, each search is made over a distance d at a searching angle of $a1+(x-1)\lambda$. $a1$ is a first angle threshold, x is the number of searches, and $\lambda$ is a second angle threshold. The processor 502 is further configured to stop searching within the area corresponding to the eyeball window when the searching angle is more than or equal to $a2$. $a2$ is a third angle threshold, $a2$ is more than $a1$, and $a2$ is more than $\lambda$.

The device for eye-tracking according to the embodiment of the disclosure can be embodied in a number of forms including but not limited to the following four types of devices.

(1) A mobile communication device, able to perform mobile communication and primarily providing voice and data communication. Such a device can be a smart phone (e.g., iPhone), a multimedia mobile phone, a functional mobile phone, or a low-end mobile phone, etc.

(2) An ultra-mobile personal computer device, which is a kind of personal computers, is able to compute and do processing, and generally has a mobile access to the Internet. Such a terminal can be a personal digital assistant (PDA), an MID, or an ultra-mobile personal computer (UMPC), e.g., an iPad.

(3) A portable entertainment device, able to display and play multimedia contents. Such a device can be an audio or video player (e.g., iPod), a handheld game console, an electronic book, a smart toy, or a portable vehicle navigation device.

(4) Other electronic devices capable of eye-tracking.

Those skilled in the art can appreciate that all or a part of the operations of the above-mentioned method according to the embodiment of the disclosure can be performed by a program instructing related hardware, where the program is stored in a storage medium, and includes several instructions for enabling a device (which can be a microcontroller, a chip, etc.) or a processor to perform all or a part of the operations of the method according to the embodiment of the disclosure. The storage medium may include various mediums for storing program codes such as a universal serial bus (USB) flash drive, a mobile hard disk, a read-only memory (ROM), a random access memory (RAM), or a magnetic disk or an optical disk.

Furthermore, the embodiment of the disclosure provides a non-transitory computer readable storage medium. The non-transitory computer readable storage medium stores computer instructions configured to enable the computer to perform the above-mentioned method for eye-tracking according to the embodiment of the disclosure.

Furthermore, the embodiment of the disclosure provides a computer program product. The computer program product includes a computer program stored in a non-transitory computer readable storage medium. The computer program includes program instructions. When the program instructions are executed by a computer, the computer performs the above-mentioned method for eye-tracking according to the embodiment of the disclosure.

The disclosure is described with reference to a flow chart and/or a block diagram of the method, the device (system) and the computer program product according to the embodiment of the disclosure. It shall be appreciated that each flow and/or block of the flow charts and/or the block diagrams and combinations of the flows and/or the blocks of the flow charts and/or the block diagrams can be embodied through computer program instructions. These computer program instructions can be loaded onto a general-purpose computer, a specific-purpose computer, an embedded processor or a processor of another programmable data processing device to produce a machine so that the instructions executed by the computer or the processor of the other programmable data processing device create means for performing the functions specified in one or more flows of the flow charts and/or one or more blocks of the block diagrams.

These computer program instructions can also be stored in a computer readable memory capable of directing the computer or the other programmable data processing device to operate in a specific manner so that the instructions stored in the computer readable memory create an article of manufacture including instruction means which perform the functions specified in one or more flows of the flow charts and/or one or more blocks of the block diagrams.

These computer program instructions can also be loaded onto the computer or the other programmable data processing device so that a series of operations are performed by the computer or the other programmable data processing device to create a computer implemented process so that the instructions executed by the computer or the other programmable device provide operations for performing the functions specified in one or more flows of the flow chart and/or one or more blocks of the block diagram.

Although an embodiment of the disclosure is described, those skilled in the art benefiting from the underlying inventive concept can make additional modifications and variations to the embodiment. Therefore the appended claims are intended to be construed as encompassing the described embodiment and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for eye-tracking, comprising:
    obtaining a set of face grayscale images to be detected, wherein the set of face grayscale images comprises a plurality of frames of face grayscale images;
    judging whether a contour of an iris is determined in an N-th frame of the plurality of frames, wherein N is a positive integer;
    when the contour of the iris is not determined in the N-th frame, detecting a pupil in the N-th frame, and determining a central position of the pupil in the N-th frame;
    determining an area of the N-th frame of the face grayscale images corresponding to an eyeball window, wherein the central position of the pupil is a center of the area; and
    determining the contour of the iris in the N-th frame according to the area corresponding to the eyeball window.

2. The method according to claim 1, wherein when the contour of the iris is determined in the N-th frame, then the method further comprises:
    making the central position of the pupil determined according to the contour of the iris in the N-th frame as a central position of the pupil in an (N+1)-th frame;
    determining an area of the (N+1)-th frame of the face grayscale images corresponding to an eyeball window, wherein the central position of the pupil in the (N+1)-th frame is a center of the area of the (N+1)-th frame corresponding to the eyeball window; and
    determining a contour of the iris in the (N+1)-th frame according to a preset condition and the area of the (N+1)-th frame corresponding to the eyeball window.

3. The method according to claim 1, wherein detecting the pupil in the N-th frame, and determining the central position of the pupil in the N-th frame comprises:
    performing horizontal integral projection for the N-th frame, and obtaining a horizontal projection curve of the N-th frame;
    determining coordinates of left and right eyeballs in a vertical direction of the N-th frame according to the horizontal projection curve of the N-th frame;
    performing vertical integral projection for an area of the N-th frame corresponding to coordinates of the left and right eyeballs in the vertical direction of the N-th frame, and obtaining a vertical projection curve of the N-th frame;
    determining coordinates of the left and right eyeballs in a horizontal direction of the N-th frame according to the vertical projection curve of the N-th frame; and
    determining the central position of the pupil according to the coordinates of the left and right eyeballs in the vertical and horizontal directions of the N-th frame.

4. The method according to claim 3, wherein performing the horizontal integral projection for the N-th frame and obtaining the horizontal projection curve of the N-th frame comprises:
    removing pixels having grayscale values above a first threshold in the N-th frame, then performing horizontal integral projection for the N-th frame, and obtaining the horizontal projection curve of the N-th frame.

5. The method according to claim 3, wherein determining the coordinates of the left and right eyeballs in the vertical direction of the N-th frame according to the horizontal projection curve of the N-th frame comprises:
    preprocessing the horizontal projection curve of the N-th frame, and determining coordinates in the N-th frame corresponding to an area between a second trough and a third trough of the preprocessed horizontal projection curve of the N-th frame as the coordinates of the left and right eyeballs in the vertical direction of the N-th frame;

wherein the horizontal projection curve of the N-th frame is preprocessed by selecting values of peaks in the horizontal projection curve, and a distance of each of the peaks along the vertical direction of the N-th frame from a nearest trough or crest of the horizontal projection curve is greater than a second threshold.

6. The method according to claim 3, wherein determining the coordinates of the left and right eyeballs in the horizontal direction of the N-th frame according to the vertical projection curve of the N-th frame comprises:

preprocessing the vertical projection curve of the N-th frame, and determining coordinates, in the N-th frame, corresponding to two symmetric troughs, with a central axis of the preprocessed vertical projection curve of the N-th frame being a symmetry axis, in the vertical projection curve of the N-th frame, as the coordinates of the left and right eyeballs in the horizontal direction of the N-th frame;

wherein the vertical projection curve of the N-th frame is preprocessed by selecting peak values with their distances between a trough and a peak being above the second threshold in the vertical projection curve of the N-th frame.

7. The method according to claim 3, wherein determining the central position of the pupil according to the coordinates of the left and right eyeballs in the vertical direction and horizontal directions of the N-th frame comprises:

selecting pixels having grayscale values below a third threshold in an area defined by the coordinates of the left and right eyeballs in the vertical and horizontal directions of the N-th frame to constitute two sets of positions of pupils of the left and right eyeballs, wherein the two sets of positions consist of coordinates of the pixels having grayscale values below the third threshold in the area; and determining a centroid of one of the two sets of positions as the central position of the pupil.

8. The method according to claim 1, wherein determining the area of the face grayscale image corresponding to the eyeball window comprises:

making leftward and rightward extensions over a first preset distance in a horizontal direction of the N-th frame, and making upward and downward extensions over a second preset distance in a vertical direction of the N-th frame, wherein each of the extensions has the central position of the pupil as a center; and determining areas extended over the N-th frame with the central position of the pupil being the center of the extensions as the area corresponding to the eyeball window.

9. The method according to claim 1, wherein determining the contour of the iris in the N-th frame according to the area corresponding to the eyeball window comprises:

starting to search from the central position of the pupil and within the area corresponding to the eyeball window according to a preset condition;

determining a grayscale value of a position to which a search is made as a reference grayscale value of the search;

if a difference between a reference grayscale value of an M-th search and a reference grayscale value of an (M+1)-th search is above a fourth threshold, then determining a point to which the M-th search is made as a point at an edge of the iris, wherein M is a positive integer; and determining the contour of the iris in the N-th frame according to points at edges of the iris.

10. The method according to claim 9, wherein the preset condition is that each search is made over a distance d at a searching angle of a1+(x−1)λ;

a1 is a first angle threshold, x is the number of searches, and λ is a second angle threshold;

the method further comprises:

when the searching angle is more than or equal to a2, stopping searching within the area corresponding to the eyeball window;

a2 is a third angle threshold, a2 is more than a1, and a2 is more than λ.

11. An apparatus for eye-tracking, comprising:

a processor; and a memory storing at least one instruction, wherein the processor is configured to execute the at least one instruction to:

obtain a set of face grayscale images to be detected, wherein the set of face grayscale images comprises a plurality of frames of face grayscale images;

judge whether a contour of an iris is determined in an N-th frame of the plurality of frames, wherein N is a positive integer;

detect a pupil in the N-th frame and determine a central position of the pupil in the N-th frame when the contour of the iris is not determined in the N-th frame;

determine an area of the N-th frame corresponding to an eyeball window, wherein the central position of the pupil is a center of the area; and determine the contour of the iris in the N-th frame according to the area corresponding to the eyeball window.

12. The apparatus according to claim 11, wherein when the contour of the iris is determined in the N-th frame, then the processor is further configured to execute the at least one instruction to:

make the central position of the pupil determined according to the contour of the iris in the N-th frame as a central position of the pupil in an (N+1)-th frame;

determine an area of the (N+1)-th frame corresponding to an eyeball window, wherein the central position of the pupil in the (N+1)-th frame is a center of the area of the (N+1)-th frame corresponding to the eyeball window; and determine a contour of the iris in the (N+1)-th frame according to a preset condition and the area of the (N+1)-th frame corresponding to the eyeball window.

13. The apparatus according to claim 11, wherein the processor is further configured to execute the at least one instruction to:

perform horizontal integral projection for the N-th frame, and obtain a horizontal projection curve of the N-th frame;

determine coordinates of left and right eyeballs in a vertical direction of the N-th frame according to the horizontal projection curve of the N-th frame;

perform vertical integral projection for an area of the N-th frame corresponding to coordinates of the left and right eyeballs in the vertical direction of the N-th frame, and obtain a vertical projection curve of the N-th frame;

determine coordinates of the left and right eyeballs in a horizontal direction of the N-th frame according to the vertical projection curve of the N-th frame; and determine the central position of the pupil according to the coordinates of the left and right eyeballs in the vertical and horizontal directions of the N-th frame.

14. The apparatus according to claim 13, wherein the processor is further configured to execute the at least one instruction to:
remove pixels having grayscale values above a first threshold in the N-th frame, then perform horizontal integral projection for the N-th frame, and obtain the horizontal projection curve of the N-th frame.

15. The apparatus according to claim 13, wherein the processor is further configured to execute the at least one instruction to:
preprocess the horizontal projection curve of the N-th frame, and determine coordinates in the N-th frame corresponding to an area between a second trough and a third trough of the preprocessed horizontal projection curve of the N-th frame as the coordinates of the left and right eyeballs in the vertical direction of the N-th frame;
wherein the horizontal projection curve of the N-th frame is preprocessed by selecting values of peaks in the horizontal projection curve, and a distance of each of the peaks along the vertical direction of the N-th frame from a nearest trough or crest of the horizontal projection curve is greater than a second threshold.

16. The apparatus according to claim 13, wherein the processor is further configured to execute the at least one instruction to:
preprocess the vertical projection curve of the N-th frame, and determine coordinates, in the N-th frame, corresponding to two symmetric troughs, with a central axis of the preprocessed vertical projection curve of the N-th frame being a symmetry axis, in the vertical projection curve of the N-th frame, as the coordinates of the left and right eyeballs in the horizontal direction of the N-th frame;
wherein the vertical projection curve of the N-th frame is preprocessed by selecting peak values with their distances between a trough and a peak being above the second threshold in the vertical projection curve of the N-th frame.

17. The apparatus according to claim 13, wherein the processor is further configured to execute the at least one instruction to:
select pixels having grayscale values below a third threshold in an area defined by the coordinates of the left and right eyeballs in the vertical and horizontal directions of the N-th frame to constitute two sets of positions of pupils of the left and right eyeballs, wherein the two sets of positions consist of coordinates of the pixels having grayscale values below the third threshold in the area; and
determine a centroid of one of the two sets of positions as the central position of the pupil.

18. The apparatus according to claim 11, wherein the processor is further configured to execute the at least one instruction to:
make leftward and rightward extensions over a first preset distance in a horizontal direction of the N-th frame, and make upward and downward extensions over a second preset distance in a vertical direction of the N-th frame, wherein each of the extensions has the central position of the pupil as a center; and
determine areas extended over the N-th frame with the central position of the pupil being the center of the extensions as the area corresponding to the eyeball window.

19. The apparatus according to claim 11, wherein the processor is further configured to execute the at least one instruction to:
start to search from the central position of the pupil and within the area corresponding to the eyeball window according to a preset condition;
determine a grayscale value of a position to which a search is made as a reference grayscale value of the search;
if a difference between a reference grayscale value of an M-th search and a reference grayscale value of an (M+1)-th search is above a fourth threshold, then determine a point to which the M-th search is made as a point at an edge of the iris, wherein M is a positive integer; and
determine the contour of the iris in the N-th frame according to points at edges of the iris.

20. The apparatus according to claim 19, wherein
the preset condition is that each search is made over a distance d at a searching angle of $a1+(x-1)\lambda$;
$a1$ is a first angle threshold, x is the number of searches, and $\lambda$ is a second angle threshold;
the processor is further configured to execute the at least one instruction to stop searching within the area corresponding to the eyeball window when the searching angle is more than or equal to $a2$;
$a2$ is a third angle threshold, $a2$ is more than $a1$, and $a2$ is more than $\lambda$.

21. A non-transitory computer readable storage medium, storing computer instructions configured to enable a computer to perform the method for eye-tracking according to claim 1.

22. A computer program product, comprising a computer program stored in a non-transitory computer readable storage medium, wherein the computer program comprises program instructions, and when the program instructions are executed by a computer, the computer is configured to perform the method for eye-tracking according to claim 1.

* * * * *